United States Patent [19]

Onasch et al.

[11] Patent Number: 4,527,932
[45] Date of Patent: Jul. 9, 1985

[54] SELF-TAPPING SCREW

[75] Inventors: Jürgen Onasch; Gottfried Ehrenstein, both of Kassel, Fed. Rep. of Germany

[73] Assignee: Richard Bergner GmbH & Co., Schwabach, Fed. Rep. of Germany

[21] Appl. No.: 471,713

[22] Filed: Mar. 3, 1983

[30] Foreign Application Priority Data

Mar. 5, 1982 [DE] Fed. Rep. of Germany ....... 3207975

[51] Int. Cl.³ .............................................. F16B 35/00
[52] U.S. Cl. .................................... 411/411; 411/423
[58] Field of Search ............... 411/308, 309, 310, 311, 411/411, 412, 413, 414, 415, 416, 417, 418, 387

[56] References Cited

U.S. PATENT DOCUMENTS

| 1,229,560 | 6/1917 | Whiteman | 411/411 |
| 1,451,484 | 4/1923 | Woodward | 411/311 |
| 2,512,082 | 6/1958 | Bainbridge et al. | 411/416 |
| 3,433,117 | 3/1969 | Gowen et al. | 411/411 |
| 3,726,330 | 4/1973 | Adler | 411/411 X |
| 3,748,949 | 7/1973 | Dreger | 411/411 |

FOREIGN PATENT DOCUMENTS

| 204256 | 12/1958 | Austria | 411/411 |
| 2240528 | 3/1974 | Fed. Rep. of Germany . | |
| 2754870 | 6/1979 | Fed. Rep. of Germany | 411/411 |
| 2912924 | 10/1980 | Fed. Rep. of Germany . | |
| 876474 | 4/1942 | France | 411/411 |
| 1108679 | 9/1955 | France . | |
| 2344741 | 10/1977 | France . | |
| 566907 | 1/1945 | United Kingdom | 411/411 |

Primary Examiner—Thomas J. Holko
Attorney, Agent, or Firm—Spencer & Frank

[57] ABSTRACT

For the purpose of assuring, during insertion in plastic, a highly stressable connection between screw and plastic with relatively small driving torques, a self-tapping screw is provided with a symmetrical thread profile whose thread angle (8) changes steadily from the crest (5) of the flank to the root (3) of the thread.

11 Claims, 2 Drawing Figures

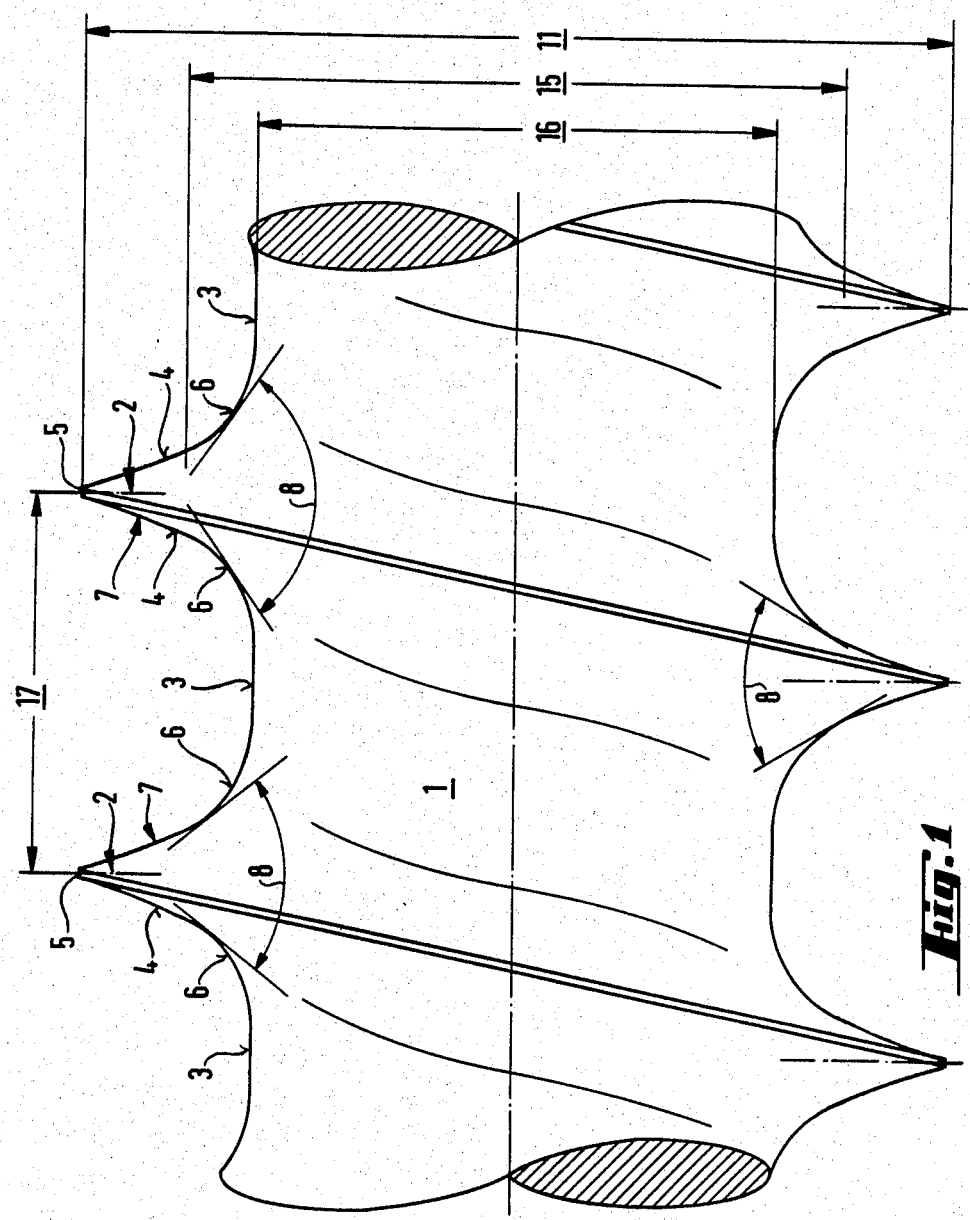

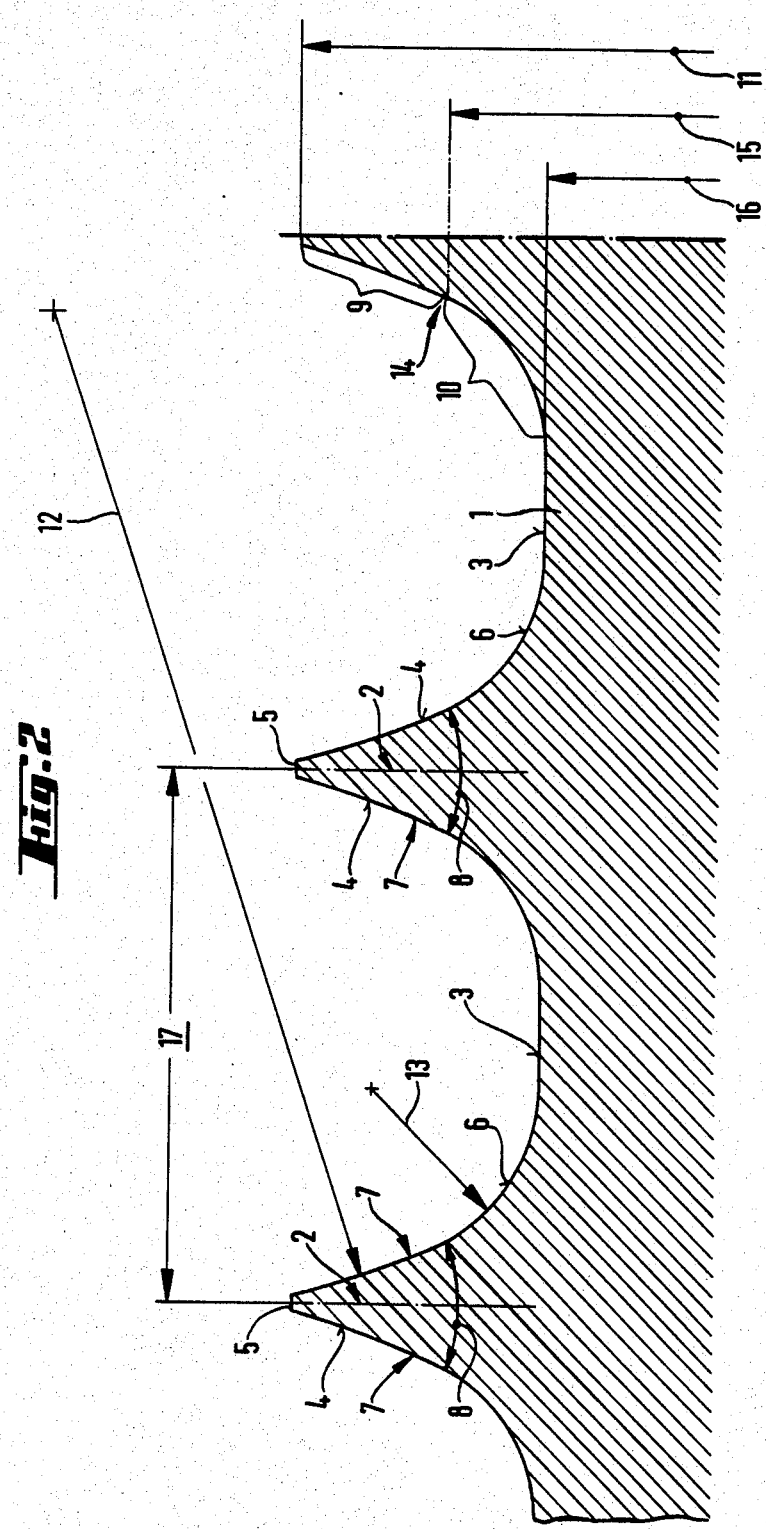

SELF-TAPPING SCREW

BACKGROUND OF THE INVENTION

The invention relates to a self-tapping screw having a symmetrical thread profile and a rounded transition between the flanks and the roots of the thread. Such screws can be summarized by the term "wood screws" and essentially comprise a head and a screw shank in the form of an elongate cone whose end opposite the head (screw tip) tapers more or less to a point. The screw shank is surrounded by a helically circumferential cutting edge which projects radially from the root of the thread, the latter changing, with a more or less defined bend, to the two flanks of the thread. The flanks themselves are provided with a constant pitch from the root of the thread to their crest so that a constant thread angle results between the two flank lines, usually of approximately 60° (Lueger, Lexikon der Technik [Technical Encyclopaedia], Volume 1, Basics of Machine Construction, page 164, right-hand column). Such screws are also used to screw plastics.

In addition, a plurality of other screws are known which differ from the generic wood screw essentially only by the selected constant thread angle, pitch and height of the flanks. The so-called chip board screw serves as an example.

When used in plastics, all known screws have the drawback that the plastic is damaged when the screws are screwed in, for example in that the pilot holes burst open or stress cracks are formed, with relatively high driving torques being required at the same time.

SUMMARY OF THE INVENTION

It is the object of the invention to provide a universal screw which, with a relatively small driving torque, assures a highly stressable connection between screw and plastic, even with different consistencies of the plastic. This is accomplished by providing a screw wherein the thread angle changes steadily from about 20°–30° at the crest of the flank to about 180° at the root of the thread, with the change in thread angle being less in the radially outer region of the cutting thread than in the radial inner region, and wherein the diameter of the thread core ranges from about 0.5 to 0.7 times the outer diameter.

With the profile provided by the invention, the plastic which, during the screw-in process, is heated to a considerable degree due to plastic deformation and friction, is able to flow easily into the valleys of the thread and flow out over the root of the thread. Crack formation and chipping of the pilot hole are thus avoided and, in particular, the thread cut by the screw is more resistant to overturning of the screw, i.e. to the cut screw threads shearing off.

In the region of the crests of the flanks of tapering cutting edges, only a relatively small volume of plastic is displaced when the screw is driven in. Moreover, with the notch-free configuration of the screw, i.e. the rounded transition between flanks and root of the thread, the inherent strength of the screw is increased. Furthermore, during manufacture of the screw, the homogeneous shaping, without sharp transitions between flanks and root of the thread, results in a better screw surface during rolling of the thread, which likewise leads to a reduction of the driving torque and to further decreased stresses on the plastic.

Due to the steady increase in the thread angle beginning at the crest of the flanks and continuing into the root of the thread, the soft flowing suitable to the plastic is even further enhanced. In particular, there will be no undesirable accumulation of material in the vicinity of the thread root which could produce high radial dynamic pressures to cause the pilot hole to burst open. Thus, smaller core hole diameters can be selected for ductile thermoplastics so that the connection can withstand even greater stresses.

The dependent claims define particularly favorable geometric dimensions of the screw which have proven themselves quite well when used in a plurality of plastics.

In connection with screws having a constant thread angle, it is generally known that such screws can be adapted to a certain degree to the brittleness or ductility of the respective plastic material by giving their core hole diameter a larger or smaller dimension. If a thread profile according to the invention is used, the selection of a narrower or wider core hole diameter additionally changes the active thread angle. For example, a core hole diameter of $0.95d_1$, where $d_1$ is the outer diameter of the screw, is recommended for particularly brittle plastics and large screw dimensions. Such a core hole diameter results in an average thread angle of about 31°. However, for a core hole diameter of $0.7d_1$ the average thread angle is about 55°. This effective thread angle, which is greater by almost 80% for $0.7d_1$, may considerably increase the strength of the connection in ductile materials by way of additional gripping, namely due to the increased radial component of the external load. Such a direct adaptation to the plastic, merely by selection of the core hole diameter, is not possible with a constant thread angle, but is a resulting feature in the design of the thread profile according to the invention. The invention also provides a dimensioning rule for the core hole diameters in dependence on the ductility of different plastics, with a core hole diameter ranging from about 0.7 of the outer diameter of the screw for very ductile plastics to about 0.95 of the outer diameter for very brittle plastics being preferred.

BRIEF DESCRIPTION OF THE DRAWINGS

FIG. 1 is a flank view of part of the thread of a screw according to the invention; and FIG. 2 is a center longitudinal sectional view of part of the thread.

DESCRIPTION OF THE PREFERRED EMBODIMENT

The tapping thread core or screw essentially includes a screw head (not shown) and a screw shank 1 surrounded by a single or multiple turn screw thread 2. The screw thread 2 projects from the thread root 3 formed by the surface of the screw shank 1 in such a manner that the slopes of its flank 4 change from the crest 5 of the flank to the root 3 of the thread.

The transition 6 from the root 3 of the thread to the flanks 7 of the cutting thread 2 is rounded. The thread angle 8 changes steadily from the crest 5 of the flank to the root 3 of the thread from 30° (at the crest 5 of the flank) to 180° (in the region of the root 3 of the thread). The thread angle change is smaller in the radially outer region 9 than in the radially inner region 10 of the cutting thread 2 and is given such a curvature that in the outer region 9 it is described by a first radius 12 which is 0.8 times the major or outer diameter 11 and in the radially inner region by a second radius 13 which is 0.135 times the outer diameter. The transition 14 from the small change in thread angle described by the second radius 13 to the large change in thread angle described by the first radius 12 lies in the region of the thread pitch or flank diameter 15, which is 0.76 times the outer diameter 11. The minor or core diameter 16 is 0.6 times the outer diameter 11, and the pitch of the screw is 0.42 times the outer diameter 11.

For a ductile thermoplastic (e.g. ABS, SB, PE, PP), a core hole diameter of 3.7 to 3.9 mm is recommended for a 5 mm screw. In that case, the thread angle of the active cutting thread 2 varies between about 30° and 50°. However, for brittle thermoplastics, e.g. PS, PMMA and SAN, or for glass fiber reinforced thermoplastics and duroplasts, a core hole diameter of about 4.3 to 4.5 mm is recommended for a screw having an outer diameter of 5 mm. In that case, the active thread angle in engagement varies between about 30° and 40°. Due to the avoidance of sharp notches in the profiles of the flanks, the screw geometry according to the invention results in increased strength in the thread as well as resistance against torsion stresses and also tensile stresses. This means that the inherent strength of the screw is increased due to reduced notch factors in the screw thread.

What we claim is:

1. In a self-tapping screw having major and minor diameters and including a thread core and a cutting thread around the core, said cutting thread having a symmetrical thread profile with a crest and flanks extending inwardly from the crest through rounded transitions to thread roots on either side of the crest, the improvement wherein:

the thread angle between the flanks changes steadily from an angle ranging from about 20° to about 30° at the crest to an angle of about 180° at the thread roots, with the change in the thread angle being less in a radially outer region that is adjacent the crest than in a radially inner region that is spaced apart from the crest;

each flank is shaped as a first circular arc having a first radius and a second circular arc having a second radius that is different from the first radius, the first and second arcs gradually merging into one another, and the minor diameter ranges from about 0.5 to about 0.7 times the major diameter.

2. The screw of claim 1, wherein said thread angle is about 30° at said crest.

3. The screw of claim 1, wherein said screw additionally has a thread pitch diameter, wherein said first circular arc is positioned within the thread pitch diameter and said first radius ranges from about 0.1 to about 0.3 times the major diameter, and wherein said second circular arc is positioned beyond the thread pitch diameter and said second radius ranges from about 0.6 to about 1.0 times the major diameter.

4. The screw of claim 3, wherein said first radius is about 0.135 times the major diameter and wherein said second radius is about 0.8 times the major diameter.

5. The screw of claim 3, wherein said screw has a pitch that ranges from about 0.3 to about 0.5 times the major diameter.

6. The screw of claim 5, wherein said pitch is about 0.42 times the major diameter.

7. The screw of claim 3, wherein the thread pitch diameter ranges from about 0.6 to about 0.8 times the major diameter.

8. The screw of claim 7, wherein said thread pitch is about 0.76 times the major diameter.

9. The screw of claim 8, wherein said crest is flattened.

10. The screw of claim 8, further comprising an element selected from the group consisting of thermoplastic, duroplast, reinforced thermoplastic, reinforced duroplast, layered laminates of thermoplastic, and layered laminates of duroplast, said element having a core hole therein ranging from about 0.7 to about 0.95 times the major diameter.

11. The screw of claim 1, 2, 3, 4, 5, 6, 7, or 8, further comprising an element of one of ductile thermoplastic and brittle thermoplastic, said element having a core hole therein, said core hole being about 0.7 times the major diameter for ductile thermoplastic and about 0.95 times the major diameter for brittle thermoplastic.

* * * * *